United States Patent [19]

Burkhardt et al.

[11] Patent Number: 4,946,691
[45] Date of Patent: Aug. 7, 1990

[54] PROCESS FOR THE PREPARATION OF ISOMERIZED HOP PELLETS

[75] Inventors: Ronald J. Burkhardt, Yakima, Wash.; Richard J. H. Wilson, Sittingborne, Great Britain

[73] Assignee: Steiner Hops Limited, Epping, Great Britain

[21] Appl. No.: 252,427

[22] Filed: Sep. 30, 1988

[30] Foreign Application Priority Data

Oct. 2, 1987 [GB] United Kingdom ............... 8723135

[51] Int. Cl.$^5$ ............................................. C12C 3/00
[52] U.S. Cl. ..................................... 426/106; 426/600
[58] Field of Search ................. 426/600, 8, 113, 106

[56] References Cited

U.S. PATENT DOCUMENTS

| | | | |
|---|---|---|---|
| 3,442,657 | 5/1969 | Bonnet | 426/600 |
| 3,758,310 | 9/1973 | Briem | 426/600 |
| 3,787,586 | 1/1974 | Hokanson | 426/600 |
| 4,049,834 | 9/1977 | Barewald | 426/600 |
| 4,123,561 | 10/1978 | Grant | 426/600 |
| 4,401,684 | 8/1983 | Versluys | 426/600 |
| 4,759,941 | 7/1988 | Checoye | 426/600 |
| 4,780,330 | 10/1988 | Laws | 426/600 |
| 4,828,867 | 5/1989 | Hallberg | 426/600 |
| 4,839,189 | 6/1989 | Forrest | 426/600 |
| 4,844,912 | 7/1989 | Haas | 426/600 |

FOREIGN PATENT DOCUMENTS

| | | | |
|---|---|---|---|
| 0240210 | 10/1987 | European Pat. Off. | 426/600 |
| 2501209 | 7/1976 | Fed. Rep. of Germany | 426/600 |
| 218903 | 2/1985 | Fed. Rep. of Germany | 426/600 |
| 245899 | 5/1987 | Fed. Rep. of Germany | 426/600 |

OTHER PUBLICATIONS

Schwartz 1974 The Brewers Digest Oct. 1974, pp. 46-49.

*Primary Examiner*—Carolyn Paden
*Attorney, Agent, or Firm*—Hayes, Soloway, Hennessey & Hage

[57] ABSTRACT

A process for the stabilization and isomerization of α-acids in hops by comminuting and treating hops with calcium or magnesium oxide or hydroxide to form the metal salts and subjecting them to an elevated temperature while isomerization to iso-α-acids occurs, is characterized in that the mixture of hops and calcium or magnesium oxide or hydroxide is formed into pellets under conditions controlled to minimize isomerization. The pellets are packed in the absence of oxygen and the sealed packs are subjected to controlled heating at about 40° to 55° C. for a period of at least one day, the time, temperature and calcium or magnesium oxide or hydroxide content being selected so as to effect substantially complete isomerization.

20 Claims, 2 Drawing Sheets

$$\% \text{ CONVERSION} = \frac{\text{Iso-}\alpha}{\text{Iso-}\alpha + \alpha} \times 100$$

PROCESS FOR THE PREPARATION OF ISOMERIZED HOP PELLETS

BACKGROUND OF THE INVENTION

This invention relates to a method of producing hop pellets in which the α-acids have been isomerised into iso-α-acids.

BRIEF SUMMARY OF THE INVENTION

Hop pellets are gaining interest as a convenient way of utilizing the hop bittering potential in combination with the aromatic potential, in the absence of undesirable co-ingredients such as organic solvents.

In U.S. Pat. No. 4,123,561 there is disclosed a method for stabilizing the α-acids in hops against deterioration through oxidation on storage. Stabilization is obtained by reacting the α-acids in powdered hops with an alkaline earth metal oxide or hydroxide, especially magnesium oxide, added as a dry powder. Magnesium salts of the α-acids are formed which protect the acids from deterioration.

It is also disclosed in this patent that the action of heat on the magnesium salts converts them into magnesium salts of iso α-acids. A process is provided which involves forming an intimate blend of hop powder and magnesium and/or calcium oxides, optionally including a minor amount of an alcohol, e.g. methanol, and heating the blend to a temperature of from about 40° to about 100° C., maintaining the mixture at that temperature for a brief period, e.g. from about to 5 to 60 minutes, while isomerization takes place, and then cooling the mixture to room temperature. As heat is generated under compression when the pellets are formed, the method envisaged a combination of the two steps so that the pellets were allowed to reach a temperature of about 75° C. and held at that temperature for a short time to allow isomerisation to occur.

Although a range of 40° to 100° C. is quoted in the patent, it appeared that the high end of the range was essential for thorough isomerisation. Indeed, in a later publication (MBAA Technical Quarterly, Vol 16, No. 2, 1979), Grant showed that α-acids could be kept for months at temperatures of 40° C. or even more without loss of bittering potential and could be efficiently converted into iso-α acids when added to boiling wort. Short periods at high temperature will cause isomerisation but the degree of isomerisation obtained by heating in the pelletting die or by high temperature treatment of the pellets for relatively short times, is non-standard and subject to considerable variation. Furthermore, heating at relatively high temperatures in the presence of air is highly undesirable. Even though the α-acids are protected by being converted into their magnesium salts and isomerised, other hop components, especially volatile oils can be lost or spoilt. There would also be a tendency for the pellets to dry out unduly and this problem would not be solved by heating under an inert gas.

The alternative of heating the pellets after they have been vacuum packed is a highly difficult operation. The problem is to ensure an adequate amount of heat reaches the inside of pellets at the centre of the pack, without overheating the outer pellets. Microwave heating could achieve this, but high temperature microwave heating of vacuum packs is at present difficult to control, partly because the isomerisation reaction is exothermic but mainly because the degree of heating obtained per unit time is dependent on the water content of the hops, which may vary from sample to sample. Furthermore, it would be very difficult to prevent over reaction since the pellets could not be cooled quickly and evenly.

However, problems can arise in the brewery if a hop product of a given α-acid content does not have a constant degree of isomerisation. Thus, a product containing predominately non-isomerised α-acids will need a longer boil than a product containing the same concentration of α-acids overall, but in which a significant proportion are isomerised. A uniform standard is of great importance to the user in the brewery.

There is thus a need for a method of producing hop pellets which are chemically stable and which are isomerised fully, or at least to a standardised and reproducible extent.

Surprisingly, we have now shown that it is possible to obtain a high and reproducible degree of isomerisation by subjecting the vacuum packs to a very much lower temperature over a longer time. The process is highly efficient, uniform isomerisation throughout the packs can be obtained, and it is easy to achieve industrially.

According to the invention we provide a process for the stabilisation and isomerisation of α-acids in hops by comminuting and treating hops with calcium or magnesium oxide or hydroxide to form the metal salts and subjecting them to an elevation temperature while isomerisation to iso-α-acids occurs, characterised in that the mixture of hops and calcium or magnesium oxide or hydroxide is formed into pellets under conditions controlled to minimise isomerisation, the pellets are packed and sealed in the absence of oxygen and the sealed packs are subjected to controlled heating at about 40° to 55° C. for a period of at least one day, the time, temperature and calcium or magnesium oxide or hydroxide content being selected so as to effect substantially complete isomerisation.

In the isomerisation processes of the prior art, a substantial proportion of the natural oils are lost, and there is a deterioration in the flavour of products prepared with such hop-products (treated hops).

In an alternative aspect, the present invention provides a hop product wherein substantially all α-acids have been isomerised to iso-α-acids and retaining the majority of natural oils.

The invention also provides beer bittered by hops treated according to the present invention.

DETAILED DESCRIPTION OF THE INVENTION

Figure 1:
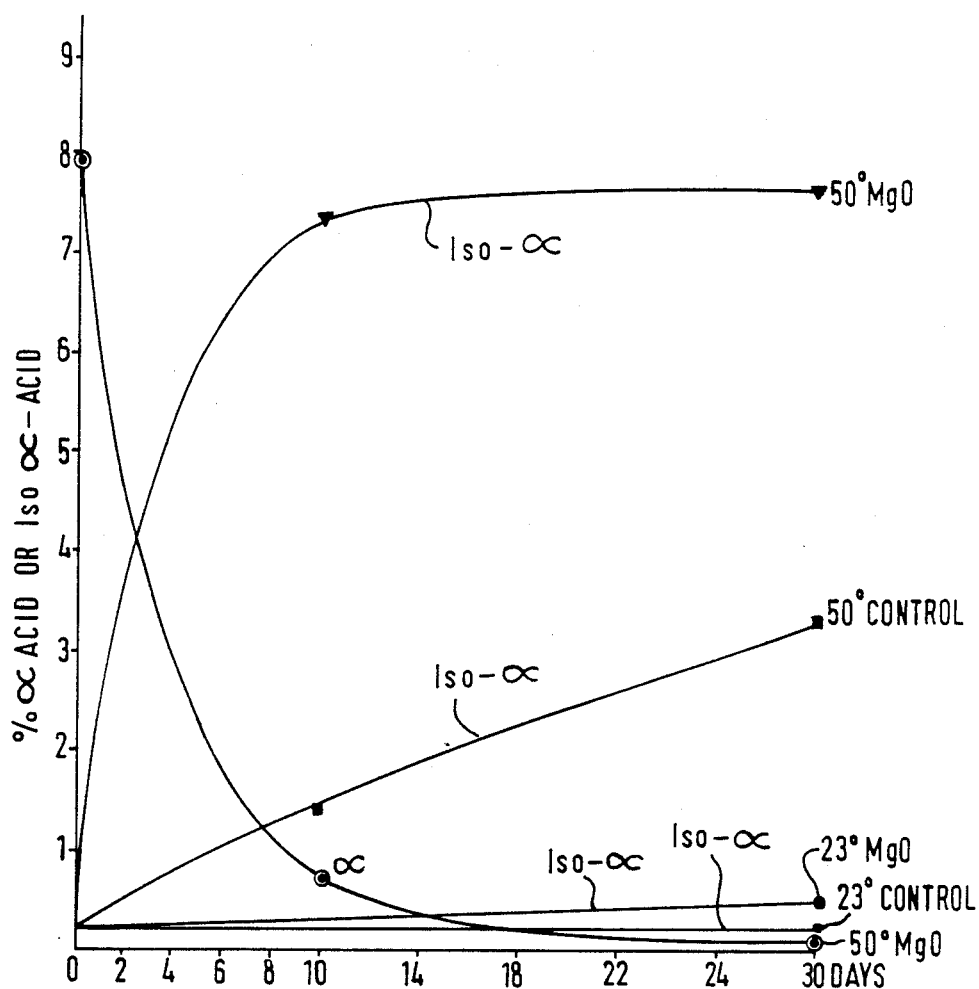

In preparing the pellets the basic conditions outlined in the above-mentioned U.S. patent should be adopted. For preference, powdered magnesium oxide should be intimately combined with powdered or otherwise comminuted hops at ambient temperature at a rate of up to 4% by weight of hops. The ratio of magnesium oxide to hops depends partly on the α-acid content of the hops and the amount of magnesium oxide is chosen so as to be a moderate excess over the stoichiometric amount required for α-acid salt formation. The higher the amounted added the faster the isomerisation will proceed, and it is important to ensure that overheating in the die does not occur. Alternatively, the magnesium oxide and hops can be mixed by tumbling and then the mixture is milled to a powder. In general, a content of magnesium oxide of 0.5 to 4% typically 1.2 to 3.2%, especially about 1.5% to 2.5% by weight, can be used. Small amounts of water can be added, if necessary, before pelletting to achieve the appropriate consistency. However, it is not normally advantageous to do this.

It is preferable to use magnesium oxide or hydroxide. Calcium oxide is generally less effective, and tends to cause heat in the compression stage. Magnesium salts, such as the carbonate, are less effective and do not prevent formation of gas which would cause pack problems. The oxide, on the other hand, reacts efficiently, causes less heat and prevents gas formation which otherwise occurs when hops are heated.

In order to minimize heating during pelletization, the throughput of the dies should be controlled to prevent overcompression and the hole length should be kept to a minimum so that heat of compression can be dissipated. The local heating in the die should be avoided, because instantaneous high temperatures can be obtained which are highly deleterious. Polishing the surfaces of the die to reduce friction is also advantageous. To avoid substantial isomerisation during pelletting, it is usually necessary to ensure by the above means that the temperature of the pellets leaving the die does not exceed 60° C. It is desirable to cool the pellets before they are packed, although this is not critical. In this connection, intensive air cooling can cause oxidation, as can prolonged exposure to air at a higher temperature. Thus, it is desirable to pack the pellets without delay.

The pellets should then be packed in the absence of oxygen, e.g. under vacuum, or under an inert gas such as nitrogen. This can be achieved by any of the conventional methods. For commercial purposes, the hop pellets are preferably bagged in quantities of 5, 10, 20 or 25 kg in heat sealable plastic film or foil laminate. Packing under inert gas is preferred to vacuum packing as the pellets remain separate and do not cohere into solid masses. Once packed, the pellets can then be heat-conditioned, according to the invention, by maintaining them at a temperature of from about 40° to 55° C., preferably about 43° to 54° C., most preferably about 45° to 50° C. The temperature should not exceed 55° C. as at higher temperature there is a definite danger of exothermic reaction becoming uncontrollable.

The heat treatment should be for at least one day, generally from 2 to 30 days, more preferably 5 to 15 days and especially 7 to 10 days. Obviously, the time will depend on the temperature selected, and also to a certain extent on the amount of calcium or magnesium oxide or hydroxide and α-acids present. The conditioning can conveniently be achieved by storing pallets loaded with the bags in an ambient temperature of, say, 50° C. and then removing them from store at an appropriate time. For accuracy, it is convenient to sample the stored material at intervals and to terminate the heat treatment when the required degree of isomerisation, e.g. 90% to 100%, preferably, 95-98%, has been obtained. The extent of the isomerisation may be readily assessed by interval testing of individual samples of pellets (usefully about 50 g) that have been distributed as miniature vacuum packs both on and under the pallets. Efficient air circulation around the bags and under the pallets is essential, to ensure even heating throughout. It is recommended to insulate the floor, walls and ceiling of the heated room or warehouse used for the isomerisation of the pellets. Preferably, but not essentially, the isomerisation is terminated by removal of the pellets to a cold store having good air circulation.

One possible storing mode involves passing the packs of pellets along a slowly moving conveyor through the appropriate atmosphere. One considerable advantage of the temperature range chosen is that it can be endured for brief periods by operators, so that manual manipulation of the packs can be achieved if necessary.

We find that this relatively simple procedure provides a highly uniform and dependable product which is substantially fully isomerised and which gives highly reproducible and efficient bittering results in the boil. Since the heat treatment involves only moderately low temperatures and is not carried out in the presence of air, the essential oils and other components in the hop are preserved. The isomerisation is slow enough to be easily controlled in bulk packs. The quality of the product is better and the product is uniform and truly stable as regards iso α-acid content.

The following examples illustrate the invention.

EXAMPLE 1

Effect to Temperature of Isomerisation

A blend of baled hops was intimately mixed with magnesium oxide (Martin Marietta, Type 30) at about 1.5% by weight and the mixture was milled to powder and then pelletized through a die (about 7–8 mm diameter holes) keeping the temperature as low as possible without special cooling. Control pellets containing no magnesium oxide were also prepared. The pellets were vacuum packed into 20 kg cartons. Experimental samples of 60 g were then separately vacuum packed in plastic and aluminium foil laminate and were stored at 23° C. or 50° C. for 30 days. Samples were analysed at the start, after 10 days and after 30 days, for α-acids and iso-α-acids. The results are represented graphically in FIG. 1.

EXAMPLE 2

Demonstration of the effect of temperature on isomerisation rate

Experimental

Fresh, kilned Wye Target hops were pulverised in a hammer mill to make a fairly coarse powder. The powder was well mixed and split into two lots of 5 kg each. The first lot (control) was processed into pellets (6 mm diameter) in a pilot scale pellet press. The second lot was placed in a tumble mixer and 137.5 g of magnesium oxide (Anscor 'N', Steetley Co., Ltd., Hartlepool) was added. The mixture was tumbled for 8 min. before pelleting as before. The stabilised pellets produced in this way were a little harder than the control pellets but otherwise of similar quality. They were analysed by HPLC:

|  | Iso-α-acids (%) | α-acids (%) | β-acids (%) |
|---|---|---|---|
| Control | 0.2 | 11.3 | 4.4 |
| Stabilized | 0.2 | 11.0 | 4.3 |

Both sets of pellets were vacuum packed in 60 g lots in laminated aluminium foil/polyester bags having a high resistance to oxygen transfer. The packs were then frozen. Sample packs were then heated as required by immersion in a water bath at constant temperature for up to 14 days before analysing the pellets. Different temperature settings were used for each experiment, varying between 40° and 50° C.

Figure 2:
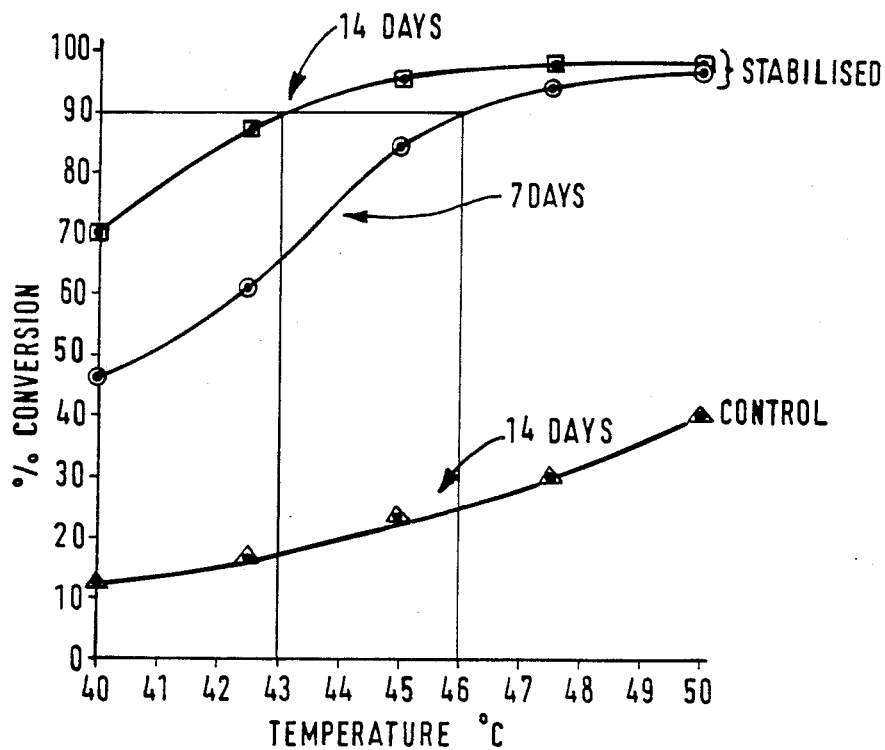

FIG. 2 shows the degree of isomerisation obtained as a function of temperature and time.

It is seen that the isomerisation rate is greatly dependent upon the temperature in the range 40°–50° C. For example, after 7 days at 40° C. the stabilised pellets are only 46% isomerised, whilst at 50° C. the isomerisation is almost complete (97%).

The best quality of product is obtained by conversion at lower temperatures but as shown by FIG. 2, the time required may become inconviently long. In the production of isomerised pellets, pallets of packaged pellets (typically packed in 20 or 25 kg. packs with 20 to 50 boxes per pallet) can be heat treated for periods of, typically, 1–3 weeks. A total conversion of at least 90%, preferably above 95% will be sought. Conversion above 99% would be expected to be undesirable because of the danger of losing iso-α-acid by heat induced, slow degradation.

In the example above, suitable conversion conditions would be either 7 days at 50° C. (97% conversion) or 14 days at 45° C. (96% conversion). The better quality product would be achieved at the lower temperature. Attempting to convert palletised hop pellets at too high a temperature would lead to noticeably poorer quality. Furthermore, it would be difficult to control, as a short heating time would be indicated and there would be insufficient time for heat to penetrate to the centre of the pallets, resulting in uneven isomerisation.

It is noticeable that a rise of only 3° from 43° to 46° C. halved the time taken to reach an isomerisation of 90%.

EXAMPLE 3

Demonstration of consistency of isomerised pellets when produced in bulk and isomerised in palletised packs Stabilised Cluster pellets were prepared using 1.9% addition of MgO (Martin Marietta, Type 30). These pellets were packed in 20 kg lots in aluminium foil/polyester bags contained in cardboard boxes. The bags were first evacuated to remove air and then back-flushed to atmospheric pressure with nitrogen and sealed. The boxes were then closed, taped shut and stacked on a pallet. The pallet was covered with a plyboard square and shrunk wrapped. There were 4 boxes per layer, 5 layers deep.

The pallet was removed to a heated room, controlled at 46° C. with air circulation induced by a powerful ceiling fan. After 11 days, the pallet was removed to a cold store at about 2° C. and left for 3 days. Samples were then taken from certain boxes in different locations on the pallet. Samples were taken from just below the surface of the pellet block at the end of each box, one from a position close to the edge ('outside') of the pallet, one from near the centre ('inside').

TABLE 1

| Layer/Location | α-acids % | β-acids % | Iso-α-acids % | Conversion % |
|---|---|---|---|---|
| Top/Outside | 0.30 | 4.25 | 6.70 | 95.8 |
| Top/Inside | 0.27 | 4.38 | 6.97 | 96.3 |
| Middle/Outsde | 0.27 | 4.51 | 6.77 | 96.1 |
| Middle/Inside | 0.28 | 4.57 | 6.97 | 96.2 |
| Bottom/Outside 0.27 | 4.67 | 6.91 | 96.3 | |
| Bottom/Inside | 0.27 | 4.64 | 6.99 | 96.3 |
| Original Pellets | 6.71 | 4.88 | 0.44 | (6.2) |

In the above Table, % Conversion is calculated as follows:

$$\% \text{ Conversion} = \frac{\text{Iso-}\alpha\text{-acids (end)}}{\text{Iso-}\alpha\text{-acids} + \alpha\text{-acids(start)}} \times 100$$

Most surprisingly, pellet samples are seen to be virtually identical, irrespective of their position within the pallet.

EXAMPLE 4

The effect of prolonged heating of stabalised pellets on product quality

Six varieties of hops were converted into stabilised pellets as in Example 1 and 250 g samples vacuum packed in laminated aluminium foil/polyester bags. These packs were then held in a thermostatically controlled, heated room at 46° C. Packs were removed at intervals and tested.

Table 2 shows the amounts of α-acid in the stabilised pellets and the % addition of MgO (Martin Marietta, Type 30). The % conversion up to 9 days is also shown. (By this time, all varieties were over 90% converted).

Table 3 shows variations in the total volatile oil content of the pellets over a period of 44 days. No consistent pattern in seen and the oil content is largely unchanged. GC analysis of the oils did not indicate any consistent pattern of changes for any variety. This can be contracted with the effect at 100° C., where considerable oil loss occurs.

From Table 2 it will be also seen that the degree of isomerisation varies with hop variety. Thus for some varieties (Perle, Galena) over 90% isomerisation was obtained after 5 days. All varieties had reached at least 93% conversion in 9 days.

TABLE 2

Rate of conversion at 46° C. for different varieties.

| Variety | % MgO | Original α-acid (%) | MgO; α-acid* | % Conversion 2 days | 5 days | 9 days |
|---|---|---|---|---|---|---|
| Willamette | 1.2 | 3.2 | 3.3 | 77 | 89 | 95 |
| Cascade | 1.5 | 5.3 | 2.5 | 65 | 86 | 95 |
| Cluster | 1.5 | 6.4 | 2.1 | 54 | 87 | 96 |
| Perle | 1.5 | 8.2 | 1.6 | 78 | 94 | 97 |
| Galena | 1.5 | 9.8 | 1.4 | 81 | 93 | 97 |
| Nugget | 1.5 | 11.2 | 1.2 | 62 | 85 | 93 |

*Molar basis

TABLE 3

| PELLET OIL CONTENT | | | % CONCENTRATION OF MAJOR COMPONENTS | | | |
|---|---|---|---|---|---|---|
| Variety | Day | Oil ml/100 g | (a) | (b) | (c) | (d) |
| Willamette | 0 | 0.4 | 15.7 | 14.5 | 5.5 | 42.9 |
| | 9 | 0.3 | 11.1 | 15.4 | 5.0 | 48.2 |
| | 20 | 0.3 | 13.8 | 15.2 | 4.7 | 46.4 |
| | 44 | 0.3 | 11.2 | 15.5 | 4.5 | 48.4 |
| Cascade | 0 | 0.5 | 43.8 | 7.7 | 5.1 | 16.9 |
| | 9 | 0.5 | 35.2 | 9.3 | 6.3 | 23.2 |
| | 20 | 0.5 | 33.9 | 9.6 | 6.0 | 24.2 |
| | 44 | 0.5 | 28.4 | 10.9 | 6.5 | 28.6 |
| Cluster | 0 | 0.3 | 43.4 | 9.8 | 0.4 | 16.6 |
| | 9 | 0.3 | 24.0 | 13.0 | 0.2 | 29.4 |
| | 20 | 0.2 | 44.0 | 9.9 | 0.2 | 22.5 |
| | 44 | 0.3 | 27.4 | 12.9 | — | 31.6 |
| Perle | 0 | 1.4 | 36.5 | 12.9 | 0.9 | 34.9 |
| | 9 | 1.2 | 40.0 | 11.0 | 0.9 | 33.8 |
| | 20 | 1.0 | 44.0 | 11.0 | 0.7 | 31.6 |
| | 44 | 1.0 | 38.2 | 0.7 | 37.2 | |
| | | | 13.3 | | | |
| Galena | 0 | 0.9 | 47.7 | 9.9 | 0.3 | 13.3 |
| | 9 | 1.0 | 47.5 | 10.3 | 0.4 | 17.0 |
| | 20 | 1.0 | 43.3 | 10.9 | 0.3 | 19.2 |
| | 44 | 0.6 | 56.3 | 10.2 | — | 17.7 |

TABLE 3-continued

| PELLET OIL CONTENT | | % CONCENTRATION OF MAJOR COMPONENTS | | | |
|---|---|---|---|---|---|
| Variety | Day | Oil ml/100 g | (a) | (b) | (c) | (d) |
| Nugget | 0 | 0.8 | 47.4 | 10.8 | 0.1 | 19.7 |
| | 9 | 0.9 | 41.2 | 12.6 | 0.1 | 26.5 |
| | 20 | 1.0 | 39.1 | 13.4 | 0.1 | 28.8 |
| | 44 | 0.7 | 47.9 | 12.6 | — | 26.5 | a = Myrcene
b = Caryophylene
c = Farnescene
d = Humulene

EXAMPLE 5

Brewing Trials

Pilot scale 600l brewing trials were conducted to compare the efficiency of isomerised pellets against standard pellets made from the same powdered hops (Wye Target). Two identical ale worts (A and B; O.G. 1038) were prepared and brought to boiling point. Hop pellets were added and the worts boiled for 1 hour, before being transferred to the fermentation vessel via a heat exchanger over a period of 1½ hours After fermentation and maturation the draught beers were racked and sampled.

Table 4 shows the analysis of the pellets and Table 5 the quantities added to the worts. HPLC analysis of the beers is shown in Table 6.

The isomerised hop pellets performed most effectively. Both beers were of sound aroma and flavour though lacking 'hoppy' character.

A further pair of brews (C and D) was then prepared to examine the feasibility of making a late hop addition (5 mins from the end of the boil) with isomerised pellets. The same pellets were used as in the previous trial.

As compared with the previous trial, the late addition of standard hop pellets reduced the utilisation of the bittering potential, whilst the converse was true for the isomerised pellets. Overall, the utilisation for the isomerised pellets was 67% higher. Both beers were of good character, each possessing mild but distinct 'hoppy' flavour.

TABLE 4

| HPLC Analysis of Pellets | | | |
|---|---|---|---|
| | Iso-α-acids | α-acids | β-acids |
| Standard pellets | 0.2 | 10.7 | 4.2 |
| Isomerized pellets | 10.7 | 0.3 | 4.0 |

TABLE 5

| Brew | Pellet Type | Hop addition (g) | | |
|---|---|---|---|---|
| | | Early | Late | Total |
| A | Standard pellets | 362 | 0 | 362 |
| B | Isomerised pellets | 221 | 0 | 221 |
| C | Standard pellets | 242 | 121 | 362 |
| D | Isomerised pellets | 101 | 121 | 222 |

TABLE 6

| Brew | Pellet Type | Beer Bitterness & Utilization | | |
|---|---|---|---|---|
| | | Iso-α-acids (mg/l) | α-acids (mg/l) | Utilization % |
| A | Standard pellets | 28.6 | 1.3 | 44 |
| B | Isomerized pellets | 27.4 | none detected | 67 |
| C | Standard pellets | 26.3 | 2.7 | 41 |
| D | Isomerized pellets | 27.6 | Trace | 68 |

We claim:

1. A process for the stabilization of alpha-acids in hops by comminuting and treating hops with calcium or magnesium oxide or hydroxide to form the metal salts and subjecting them to an elevated temperature while isomerization to iso-alpha-acids occurs, comprising forming a mixture of hops and calcium or magnesium oxide or hydroxide into pellets under conditions effective to minimize isomerization, packaging and sealing the pellets in the absence of oxygen and subjecting the sealed packs to controlled heating at about 40° to 55° C. for a period of at least one day, the time, temperature and calcium or magnesium oxide or hydroxide content being selected so as to effect substantially complete isomerization.

2. The process of claim 1 wherein the hops are treated with magnesium oxide or magnesium hydroxide.

3. The process of claim 1 or 2 wherein the concentration of oxide or hydroxide is between about 0.5 to 4% by weight of hops.

4. The process of claim 1 or 2 wherein the concentration of oxide or hydroxide is between about 1.2 to 3.2% by weight of hops.

5. The process of claim 1 or 2 wherein the sealed packs are heated at a temperature of about 43° to 54° C.

6. The process of claim 1 or 2 wherein the sealed packs are heated at a temperature of about 45° to 50° C.

7. The process of claim 1 or 2 wherein the sealed packs are heated for a period of about 2 to 30 days.

8. The process of claim 1 or 2 wherein the sealed packs are heated for a period of about 5 to 15 days.

9. The process of claim 1 or 2 wherein the sealed packs are heated for a period of about 7 to 10 days.

10. The process of claim 1 or 2 wherein the pellets are packaged and sealed under a vacuum.

11. The process of claim 1 or 2 wherein the pellets are packaged and sealed in air tight packs under an atmosphere of inert gas at an absolute pressure of from zero to 1 atmosphere.

12. The process of claim 11 in which the inert gas is nitrogen.

13. The process of claim 11 or 12 in which the absolute pressure is about 1 atmosphere.

14. The process of to claim 1 to 2 in which the sealed packs are placed within cardboard boxes prior to heating.

15. The process of claim 1 or 2 in which the sealed packs of pellets are stacked prior to heating.

16. The process of claim 1 or 2 in which the packs of pellets are cooled to ambient temperature or less.

17. The process of claim 16 in which the pellets are cooled to and stored below 20° C.

18. A packaged, pelletized hops product wherein the iso-alpha-acid content comprises at least about 90% of the original alpha-acid content of the powdered hops.

19. A pelletized hops product of claim 18, wherein the iso-alpha-acid content is about 95%.

20. A packaged, pelletized hops product wherein at least about 90% of the original alpha-acid contents of the powdered hops have been isomerized to iso-alpha-acid, said hop product retaining the majority of natural oils.

* * * * *